United States Patent Office 3,660,362
Patented May 2, 1972

3,660,362
PRODUCTION OF POLYMERS HAVING LOW
COLD FLOW PROPERTIES
Richard L. Smith and Carl A. Uraneck, Bartlesville, Okla.,
assignors to Phillips Petroleum Company
No Drawing. Filed June 18, 1970, Ser. No. 47,632
Int. Cl. C08g 23/00
U.S. Cl. 260—79
8 Claims

ABSTRACT OF THE DISCLOSURE

A method of altering the cold flow properties of polymers by reacting linear metal-terminated polymers with cyclic aromatic disulfides and reacting the product thereof with oxygen or free radical generators.

---

This invention relates to the production of metal-terminated polymers.

In one of its more specific aspects, this invention relates to the production of polymers having low cold flow properties.

The polymerization of conjugated dienes in the presence of organometal compounds containing one or two metal atoms per molecule is known. One such polymerization involves the interreaction of 1,3-butadiene with butyllithium and produces a lithium metal-terminated polymer.

The products from such polymerizations are substantially linear in structure, that is, they contain substantially no long chain branching. They are also highly subject to cold flow and, as a result, problems attendant thereto are encountered in their handling and storage.

Various prior art processes are directed towards the solution of this problem. One involves interreacting the metal-terminated polymer with various polyfunctional compounds.

The present invention presents a method by which such metal-terminated linear polymers can be advantageously converted to derivatives having reduced cold flow properties. These polymeric products have broadened molecular weight distribution which improves the polymer processing characteristics. Further, the method of the present invention possesses advantages over the prior art method which introduces long chain branching into the polymer structure.

In general, the prior art procedures involve a coupling or branching reaction prior to the steps of isolating the polymer. These reactions produce a large increase in the viscosity of the polymerization reaction mixture, this increased viscosity resulting in handling difficulties. In contrast, the method of the present invention can carry out the polymer-metal-mercaptide oxidation in a steam stripping step employed to isolate the polymer, as a result of which the increase in polymer molecular weight creates no handling problems.

In both the method of the present invention and in the prior art, antioxidants are frequently added to the polymer. However, the addition of antioxidants to the long chain branching of polymers of the prior are frequently interferes with further coupling and branching of the polymers when using multifunctional reagents. No such interference is produced by antioxidants in the presence of the products of the present invention.

According to the present invention there is provided a process for improving the cold flow properties of a polymer in which the substantially linear metal-terminated polymer is reacted with a cyclic aromatic disulfide of the after-defined formula $$\overset{\displaystyle\lceil}{\text{S}}-\text{Ar}-\overset{\displaystyle\rceil}{\text{S}}$$

and the resulting product is exposed to oxygen or to a free radical generator.

Also, according to this invention, there is provided an oxidized metal-mercaptide-terminated polymer formed by the oxidation of a metal-mercaptide-terminated polymer formed by reacting a cyclic aromatic disulfide with a metal-terminated polymer.

Accordingly, it is an object of this invention to provide a metal-mercaptide-terminated polymer.

It is another object of this invention to facilitate the handling of lithium-mercaptide-terminated polymers.

These and other advantages of the present invention will become apparent from the following disclosure.

In general, the method of this invention contemplates the reaction of substantially linear metal-terminated polymers with cyclic aromatic disulfides and the subsequent exposure of the resulting product to oxygen or to a free radical generator.

The linear polymers concerned are those which originate through the polymerization of conjugated dienes and include homopolymers and copolymers thereof. Also included are copolymers produced from various vinyl group-containing monomers in the presence of organometal compounds. The copolymers should contain at least about 5 parts by weight of the conjugated diene per 100 parts by weight of the total copolymer composition. These copolymers can also be block or random in relation to the sequence distribution of the monomer units within the polymer chain. Conjugated dienes containing 4 to 12 carbon atoms and vinyl aromatic hydrocarbons containing 8 to 12 carbon atoms can be employed. Specific examples, to which the invention is not limited, include 1,3-butadiene, isoprene, 1,3-pentadiene, 2-ethyl-1,3-decadiene, styrene, 4-methylstyrene, 1-vinylnaphthalene and 2-vinylnaphthalene.

The method of this invention pertains to metal-terminated derivatives of the described polymers. Such derivatives are generally formed by employing an organometal compound as an initiator in the polymerization reaction. Such organometal compounds as are employable will provide a metal atom attached to a terminal position in the polymer formed and will subsequently react with a cyclic aromatic disulfide to form a metal mercaptide end-group on the polymer. Suitable organometal compounds include organoalkali metal compounds such as organolithiums and organocalciums containing from 2 to about 20 carbon atoms per molecule and 1 or 2 metal atoms, preferably lithium, per molecule. Specific examples to which the invention is not limited include dimethylcalcium, ethyllithium, n-butyllithium, sec-butyllithium, cyclopentyllithium, isopropylphenylpotassium, 1,6-dilithiohexane, eicosylsodium, and diphenylcalcium.

Suitable initiators include alkali metal-based initiators and alkaline earth metal-based initiators as well as the corresponding organometallic compounds thereof.

The metal-terminated polymers are reacted with cyclic aromatic disulfides having the general formula $$\overset{\displaystyle\lceil}{\text{S}}-\text{Ar}-\overset{\displaystyle\rceil}{\text{S}}$$

wherein Ar represents an aromatic hydrocarbon radical containing from about 10 to about 30 carbon atoms.

The aromatic hydrocarbon radical can contain nonreactive substituents, such as alkyl groups having from 1 to about 10 carbon atoms. Examples of suitable disulfides to which the invention is not limited include 1,8-naphthylene disulfide, 2,4-naphthylene disulfide, 3-decyl-1-,8-naphthylene disulfide, 4-cyclohexyl-1,8-naphthylene disulfide, 1,9-anthrylene disulfide, 4,5,7,10-tetrabutyl-1,9-anthrylene disulfide, 5,6, acenaphthenylene disulfide, 2,2'-biphenylylene disulfide, and 1,1' - binaphthylene-8,8'-disulfide.

The metal-terminated polymers are formed by conventional methods of polymerizing conjugated dienes in the presence of the organometal compound. Preferably, this is carried out in the presence of a hydrocarbon diluent such as hexane, cyclohexane, or toluene.

Without separation from the reaction mixture, the metal-terminated polymers are reacted with the cyclic aromatic disulfides at a temperature within the range of from about −212° to 300° F., preferably from about −100° to about 12° F., for a period of from about one minute to about 24 hours under any pressure sufficient to maintain the hydrocarbon diluent in the liquid phase. The cyclic aromatic disulfide is introduced into the reaction in an amount from about 0.1 to about 1.5 moles of the disulfide per gram-equivalent of organometal initiator employed in the initial polymerization. One gram-equivalent of a monfunctional initiator is equal to one gram mole of the initiator; one gram-equivalent of a difunctional initiator is equal to one-half gram mole of the difunctional initiator.

If desired, coupling agents, such as stannic chloride, can be introduced into the polymerization reaction in less than stoichiometric amounts in respect to the metal-terminated polymer concentration, to introduce a second type of long chain branching in the polymer.

The product of the reaction of the metal-terminated polymer and the cyclic aromatic disulfide is exposed to oxygen or to free radical generators. Suitable free radical generators include peroxides, hydroperoxides, and azo compounds such as 2,2′-azo-bis-isobutyronitrile, either individually or in combination, or with oxygen.

The product of the reaction of the metal-terminated polymer and the cyclic disulfide is exposed to oxygen or to free radical-generators without hydrolysis of the metal-mercaptide-terminated polymer. Whereas, in the prior art, the reaction product of the metal-terminated polymer and the disulfide is reacted with a reagent which is capable of replacing the alkali metal with hydrogen, in the present method no such hydrolysis takes place. Instead, the metal-mercaptide-terminated polymer is directly contacted with oxygen or a free radical generator.

In addition to this simplification as embodied in the present invention as compared to the prior art method, the present method is operable at lower temperatures; whereas the oxidation or curing of the prior art hydroatlyzed metal-mercaptide-terminated polymer was performed at temperatures between about 100° F. and about 500° F. the oxidation or curing step of the present invention can be carried out at temperatures from about −212° F. to about 300° F., although preferably at from about 10° to 90° F. The ability to conduct the process of the present invention at room temperature is a decided advantage over the prior art.

If oxygen is employed, it can be in the form of a free oxygen-containing gas, such as air. The oxygen can be introduced into contact with the reaction product of the metal-terminated polymer and the cyclic aromatic disulfide in any suitable manner and is introduced in a quantity at least equivalent to the metal-mercaptide concentration of the polymer.

Such introduction can be made directly in the reaction mixture resulting from the metal-mercaptiding reaction, the reaction conditions being the same as employed when similarly processing a metal-terminated polymer in the absence of contact with the cyclic aromatic disulfide.

Similarly, contact between the metal-mercaptide-terminated polymer and the free radical-generating compound can be made by any suitable method of introducing the free radical-generating compound into the reaction mixture resulting from the treatment of the metal-terminated polymer with the cyclic aromatic disulfide. Reaction conditions are the same as those employed when introducing oxygen into the reaction mixture.

Relatedly, oxygen contact with the metal-mercaptide-terminated polymers can be made during subsequent processing steps, such as when steam-stripping the inert hydrocarbon diluent from the reaction mixture or when drying the recovered polymer crumb. Steam stripping is advantageously carried out in about 212° F. and one atmosphere pressure.

EXAMPLE 1

The method of this invention is illustrated by an example in which 1,3-butadiene was polymerized in cyclohexane diluent employing n-butyllithium as the initiator. Into the resulting reaction mixture, 1,8-naphthylene disulfide was introduced and upon completion of the metal-mercaptiding reaction, oxygen was bubbled through the reaction mixture until the mercaptide had substantially disappeared. Reactants and conditions for each of the steps were as follows:

Polymerization:
   Materials:                                  Amount
      Cyclohexane _____ml__ 100
      1,3-butadiene _____g.__ 3
      n-Butyllithium _____mmoles__ 0.3
Reaction conditions:
   Temperature, ° F. _____ 158
   Reaction time, hours _____ 0.75
Aromatic disulfide reaction:
   Materials:
      Polymerization reaction mixture _____ Total
      1,8-naphthylene disulfide _____mmoles__ 0.2
Reaction conditions: As for polymerization.

Introduction of oxygen into the reaction mixture was then made for a period of 60 minutes at about 78° F., at the end of which period, the mercaptide concentration had been reduced from an original molar concentration of $1.09 \times 10^{-3}$ to $0.05 \times 10^{-3}$. This result demonstrates that the mercaptide is consumed under these conditions without prior hydrolysis.

EXAMPLE II

The method of this invention in respect to the reduction of cold flow properties of the resulting polymer is shown by the following example. The polymers were produced by polymerizing 100 parts by weight of 1,3-butadiene in 780 parts by weight of cyclohexane with 0.5 gram millimoles of n-butyllithium per hundred grams of monomer. The polymer products were reacted with 1,8-naphthylene disulfide in amounts of 0.25 and 0.5 gram millimoles per hundred grams of monomer. The polymers were then individually coagulated with isopropyl alcohol while stirring the coagulation mixtures in air. Cold flow measurements, in mg./min., as measured by extruding the polymer produced through a ¼ diameter orifice at 3.5 p.s.i. and 122° F., after reaching substantially stready state in 10 minutes, and inherent viscosities were as follows:

| | Amount of 1,8-napth-ylene disul-fide, mhm.[a] | Cold flow, mg./min. | Inher-ent viscos-ity [b] | H.I.[c] |
|---|---|---|---|---|
| Polymer: | | | | |
| 1 | 0 | 16.6 | 2.49 | 1.22 |
| 2 | 0.25 | 1.6 | 3.06 | 1.38 |
| 3 | 0.50 | 0.8 | 3.01 | 1.37 |

[a] Mhm.=Gram millimoles per 100 grams of monomer.
[b] Determined according to the procedure of U.S. 3,278,508, col. 20, notes a and b. Each polymer was gel-free.
[c] H.I.=Heterogeneity index. Determined by gel permeation chromatography (GPC) as the ratio of weight average ($M_w$) to number average ($M_n$) molecular weight.

These data indicate that an appreciable reduction in cold flow and a broadening of molecular weight distribution results by producing polymers in accordance with the method of this invention.

The following example illustrates that coagulation in alcohol to recover the polymer is not a prerequisite of the oxidation step.

EXAMPLE III

In the following runs, lithium-mercaptide-terminated polymers were treated with air prior to coagulation in isopropyl alcohol.

In each of the runs, the polymerization of 1,3-butadiene in the presence of n-butyllithium was conducted in substantially the same manner, that is, 10 grams of 1,3-butadiene were polymerized in the presence of 0.11 mmole of n-butyllithium in 120 ml. of cyclohexane for 0.67 hours at 158° F. at 25 p.s.i.g.

To the reaction products, 1,8-naphthylene disulfide was added (except in control run 1) after which the resulting mixtures were allowed to react at 122° F. for five minutes.

One reaction mixture was then coagulated in the usual manner by agitating with isopropyl alcohol in air at about 80° F., after which the polymer was dried in a vacuum oven under nitrogen as usual. These results are presented in the data of run 2.

In run 3, a reaction mixture was contacted with air at 20 p.s.i.g. during two periods of 15 minutes at 122° F., each separated by an intervening evacuation of the vapor space, and the resulting mixture was then coagulated with alcohol. These results were compared with run 1 in which the lithium-terminated polymer had not been reacted with the disulfide. Results were as follows:

| Run Number: | 1,8-naphthylene disulfide mmole | Order of treatment Air | Order of treatment Alcohol | Cold flow, mg./min. | Inherent viscosity |
|---|---|---|---|---|---|
| 1 | 0 | None | First | 122.4 | 1.55 |
| 2 | 0.1 | do | do | 44.9 | 1.65 |
| 3 | 0.1 | First | Second | 4.6 | 1.83 |

NOTE.—In run 2, reaction mixture exposed to air while being coagulated with alcohol.

These data indicate the operation of the method of the present invention in the absence of an alcohol coagulating step prior to, or simultaneously with, the oxidation step.

EXAMPLE IV

In substantiation of the operability of the method of the present invention in those instances wherein the copolymers are block or random in terms of sequence distribution of the monomer units within the polymer chain, the immediately preceding procedure was carried out in three runs in which 1 ml. of styrene had been added to the polymerization mixture after the butadiene had been essentially completely polymerized. The addition of the 1,8-naphthylene disulfide was made to the reaction mixtures in runs 5 and 6 after the polystyryl-lithium end group had developed. No 1,8-naphthylene disulfide was added in run 4. Run 5 was coagulated with isopropyl alcohol in air ot about 80° F. after which the polymer was dried as usual. In run 6, the reaction mixture was contacted with air in the same fashion as run 3 of Example III, and the resulting mixture was then coagulated with alcohol. Results were as follows:

| Run Number: | 1,8-naphthylene disulfide mmole | Order of treatment Air | Order of treatment Alcohol | Cold flow, mg./min. | Inherent viscosity |
|---|---|---|---|---|---|
| 4 | 0 | None[1] | First | 164.0 | 1.50 |
| 5 | 0.1 | do[1] | do | 24.0 | 1.68 |
| 6 | 0.1 | First | Second | 6.2 | 1.74 |

[1] See footnote for run 2 above.

None of the polymers produced from any of the foregoing runs of Examples III and IV contained gel.

The above data illustrate that the method of this invention produces a product of improved cold flow characteristics if the lithium-mercaptide-terminated polymers are contacted with the oxidizing agent or with the free radical generating compound prior to coagulation in alcohol instead of during the coagulation.

It will be evident from the foregoing that various modifications can be made to the method of this invention. Such, however, are considered as being within the scope of the invention.

What is claimed is:

1. A method for producing a polymer of improved cold flow properties which comprises:
   (a) contacting a substantially linear metal-terminated polymer produced by the polymerization of a conjugated diene in the presence of an orgono metal compound with a cyclic aromatic disulfide of the formula

wherein Ar represents an aromatic hydrocarbon radical containing from about 10 to about 30 corbon atoms to produce a metal-mercaptide-terminated polymer;
   (b) oxidizing said metal-mercaptive-terminated polymer with oxygen or a free radical-generator without hydrolysis of said metal-mercaptide-terminated polymer to produce an oxidized metal-mercaptide-terminated polymer; and,
   (c) recovering said polymer.

2. The method of claim 1 in which said oxidizing of said metal-mercaptide-terminated polymer is conducted simultaneously with said recovery of said polymer.

3. The method of claim 2 in which said polymer is recovered as dried polymer crumb and said oxidizing of said metal-mercaptide-terminated polymer is conducted while drying said polymer crumb.

4. The method of claim 1 in which said metal-mercaptide-terminated polymer is oxidized by contact with gaseous oxygen at a temperature within the range of from about 10° to about 90° F.

5. The method of claim 1 in which said metal-mercaptide-terminated polymer is oxidized by contact with air.

6. The method of claim 1 which said polymer is recovered by coagulation in alcohol.

7. The method of claim 6 in which said oxidizing of said metal-mercaptide-terminated polymer is conducted while coagulating said polymer.

8. The method of claim 4 in which the oxidized polymer is recovered by steam stripping.

References Cited

UNITED STATES PATENTS

| 3,048,568 | 8/1962 | Cleary | 260—79 |
| 3,383,377 | 5/1968 | Uraneck et al. | 260—94.7 |

OTHER REFERENCES

Barber et al., "Cyclic Disulfides Derived From Diphenyl," Journal of the Chemical Society, London, January–June 1928, pp. 1141 to 1149.

DONALD E. CZAJA, Primary Examiner

M. I. MARQUIS, Assistant Examiner

U.S. Cl. X.R.

260—79.1, 79.5 NV, 94.7 S